Feb. 25, 1969 R. GENTY 3,429,526
APPARATUS FOR TILTING THE ORBITAL PLANE OF A SPACE VEHICLE
Filed Nov. 3, 1965 Sheet 1 of 5

INVENTOR
ROBERT GENTY
BY
Ely, Golrick & Flynn
ATTORNEYS

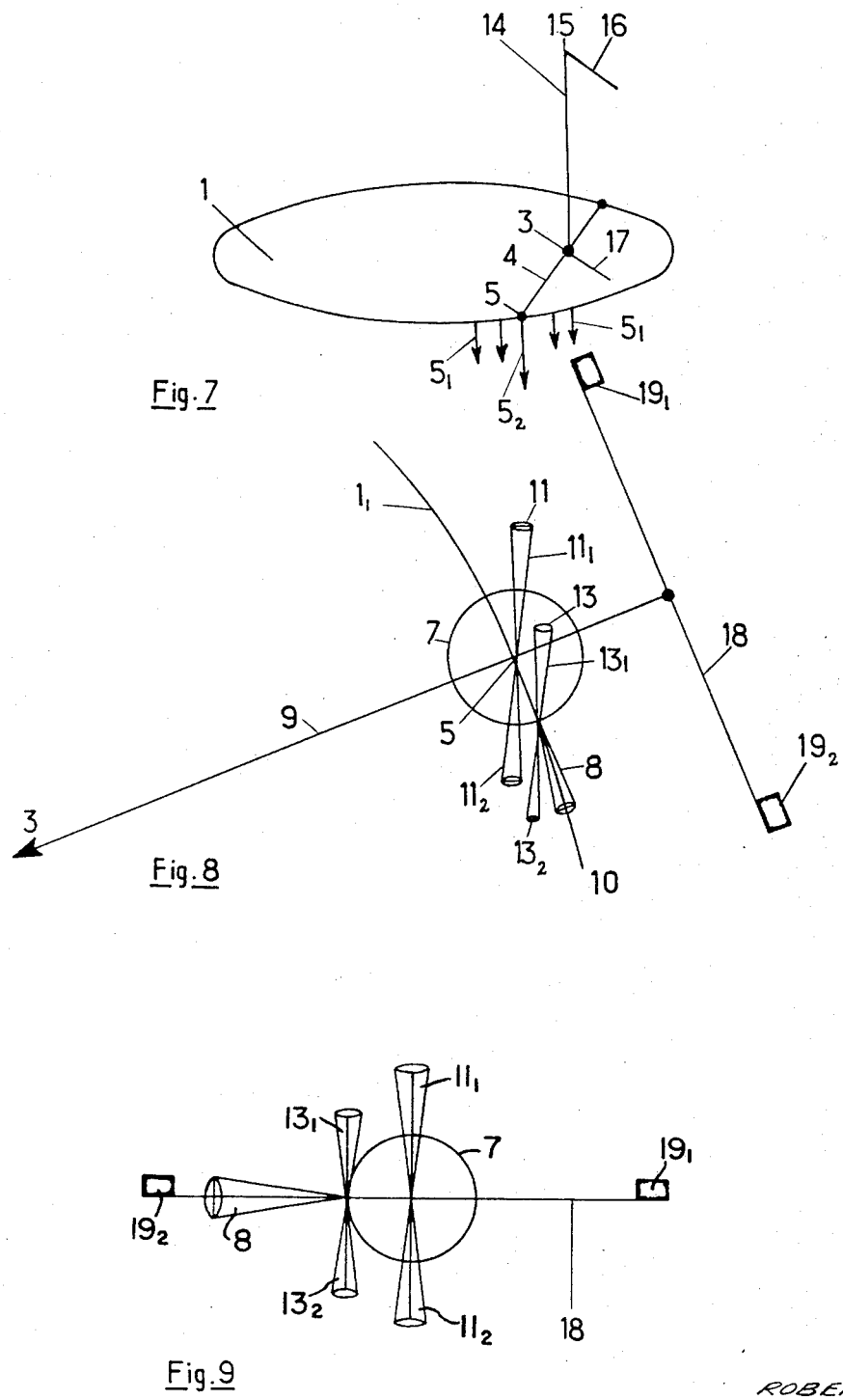

United States Patent Office 3,429,526
Patented Feb. 25, 1969

3,429,526
APPARATUS FOR TILTING THE ORBITAL PLANE
OF A SPACE VEHICLE
Robert Genty, 6 Rue Jules Simon, Paris, France
Filed Nov. 3, 1965, Ser. No. 506,228
Claims priority, application France, Nov. 7, 1964,
994,276; Ad. 18,176
U.S. Cl. 244—1                     10 Claims
Int. Cl. B64g 1/20

ABSTRACT OF THE DISCLOSURE

The present invention provides an arrangement for selectively tilting the orbital plane of a space vehicle in gravitation about an astral body. The principal thruster on the vehicle produces a thrust along an axis tangent to the vehicle's orbit. The vehicle carries a gravity gradient means which is oriented radially of the vehicle orbit. Tilt thrusters on the vehicle produce respective tilt thrusts which are directed perpendicular to the tangent axis and perpendicular to the orbit radius at the center of gravity of the vehicle symmetrically before and after the turning point about which the orbital plane is tilted. Correcting thrusters produce a correcting thrust parallel to the tilting thrust and offset from the latter along the tangent axis.

One of the objects of the invention is to produce an arrangement for use on a space vehicle to enable a rigorous orientation and positioning of the space vehicle in gravitational orbit about an astral body.

Another object of the invention is to be able, by this rigorous orientation and positioning of a space vehicle in gravitation, to obtain tilting of the orbital plane of the space vehicle in a correct manner.

Other objects and advantages of the invention will be apparent from the following detailed description of three presently-preferred embodiments, which are illustrated schematically in the accompanying drawings, in which:

FIGURE 1 illustrates the process enabling the tilting of the orbital plane of a space vehicle which is in gravitational orbit about an astral body, FIGURE 2 is a diagrammatical perspective of a space vehicle according to a first embodiment of the present invention placed in its orbit, FIGURE 3 shows the FIG. 2 space vehicle schematically in greater detail, looking toward its orbital plane, FIGURE 4 is a view of the FIG. 3 space vehicle, taken along the line 4—4 in FIG. 3 normally in the orbit plane, FIGURE 5 is a right-end view of the FIG. 4 space vehicle, FIGURE 6 is a diagram showing the principle of tilting the orbit plane of a gravitating space vehicle in the prior process, called "by percussion,"

FIGURE 7 is a diagram showing the direction of various forces and explaining the tilting of the space vehicle according to the invention, FIGURE 8 shows schematically in perspective a space vehicle in accordance with a second embodiment of the present invention, placed in its orbit.

FIGURE 9 shows a side view of the space vehicle of FIGURE 8,

Up till now, for tilting the orbital plane of a gravitating space vehicle, a process has been used consisting of applying to the space vehicle, at the moent when it passes the desired turning point, a theoretically instantaneous force, suitably oriented.

However, by this process, as is obivous, it is impossible to impart an "instantaneous" force to the space vehicle. Failing this, this very great force is applied during a very brief moment, and entails, for the space vehicle, an acceleration that is very much greater than that necessary for launching the carrier rocket.

A process is also known which enables the tilting of the orbital plane of a space vehicle in gravitation by causing correct right or left turns of a space vehicle to be made.

However, this process, up till now, has only been a theoretical demonstration which could not be the subject of a concrete application. This known process consists of applying a constant force to the gravitating space vehicle, during a given time before its turning point, and to apply this same force during the same time and in the same direction after the turning point.

Figure 1:
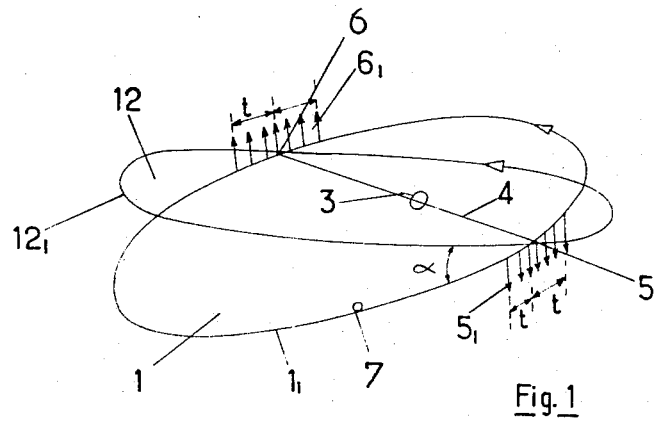
Figure 2:
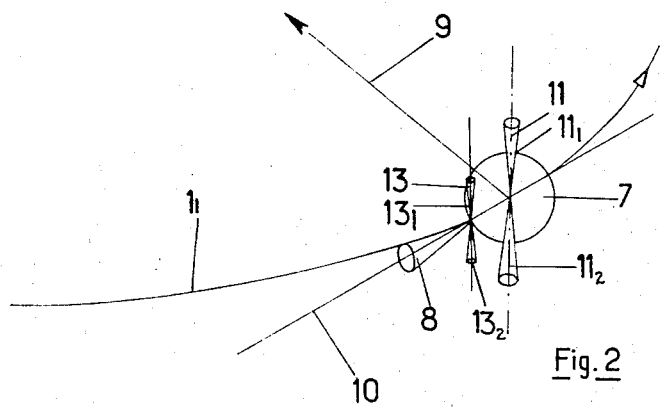

By turning point is meant the exact point at which the orbital plane of the space vehicle is tilted about a radius vector 4 (FIG. 1) of its previous orbit, which radius vector passes through the center of the astral body around which the gravitating space vehicle revolves.

The present invention has the object of enabling the tilting of the orbital plane of a space vehicle 7 gravitating around an astral body 3.

This tilting of the orbital plane 1 takes place around a radius vector 4 of said orbit.

To obtain this tilting of the orbital plane, there is imparted to the space vehicle an additional or tilt thrust normal to the orbit plane, at the turning point 5 or 6, this additional or tilt thrust being applied to the center of gravity of the space vehicle.

The turning points 5 and 6 are situated at the intersection of the orbit $1_1$ and the radius vector 4 of said orbit.

However, since an instantaneous additional thrust developed at a turning point would be of too short duration, in accordance with the present invention this tilt thrust is applied over a period of time extending symmetrically before and after the turning points 5 and 6.

This time during which the tilt thrust is applied will, however, be limited so that it does not exceed 90° of the orbital path of the space vehicle before and after these turning points.

It is also advisable to notice that the tilt thrust will be in the opposite direction at the turning point 6 from its direction at the turning point 5.

Nevertheless, each of the tilt thrusts $5_1$ and $6_1$ (FIG. 1) must always be normal to the orbit plane, and the thruster producing it must thus be kept permanently perpendicular to the orbit plane, this being obtained while taking the following considerations into account:

At the moment when the last principal thrust has put the space vehicle into orbit, the thruster 8 on the space vehicle which produced the principal thrust which put the vehicle into orbit is, by its construction, aligned with a line tangent to the orbit.

According to the invention, a gravity gradient device 2, for example, of the mass type, is placed on the body 7 of the space vehicle in a fixed position in relation to the thruster 8 which produced the principal thrust.

This gravity gradient device 2 is always oriented radially of the orbit of the space vehicle along a line 9 passing through the center of gravitation along the radius 4.

This line 9 thus forms a second fixed axis of the space vehicle, the first fixed axis being the axis 10 of the principal thruster 8.

These two axes 10 and 9 thus define the initial plane 1 of gravitation, i.e., the initial orbit plane of the space vehicle.

A tilt thrust producing means 11 is rigidly positioned with respect to these two axes 9 and 10 so that it produces an additional thrust which is permanently perpendicular to the plane defined by the axes 9 and 10, and thus normal to the initial orbit plane 1.

Figure 3:
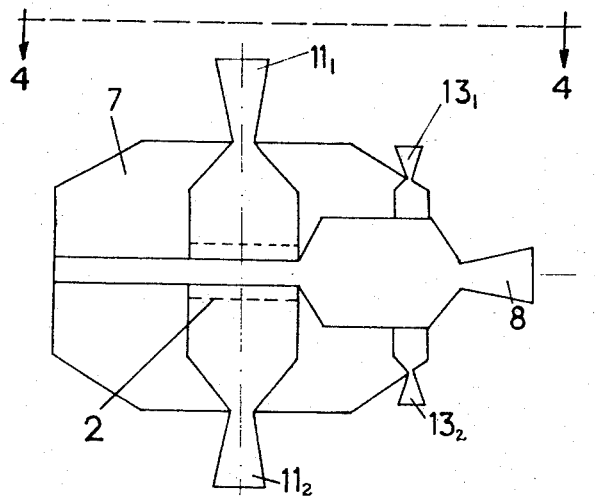
Figure 4:
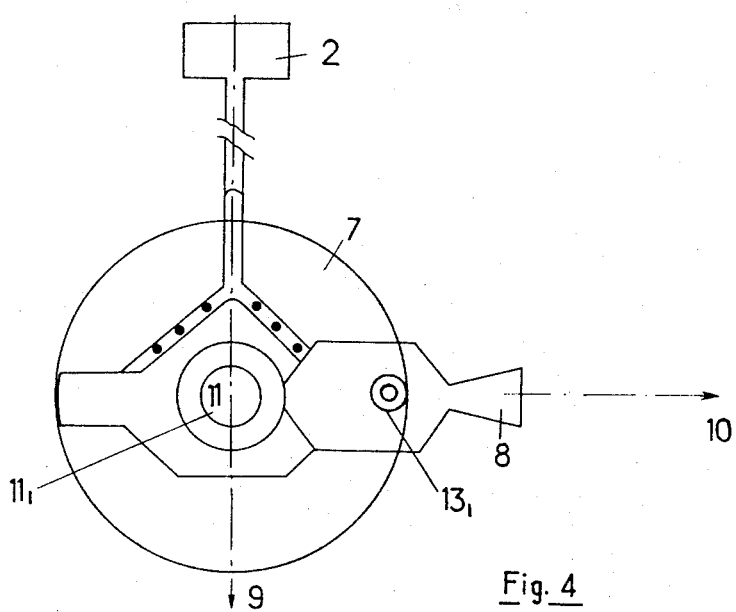
Figure 5:
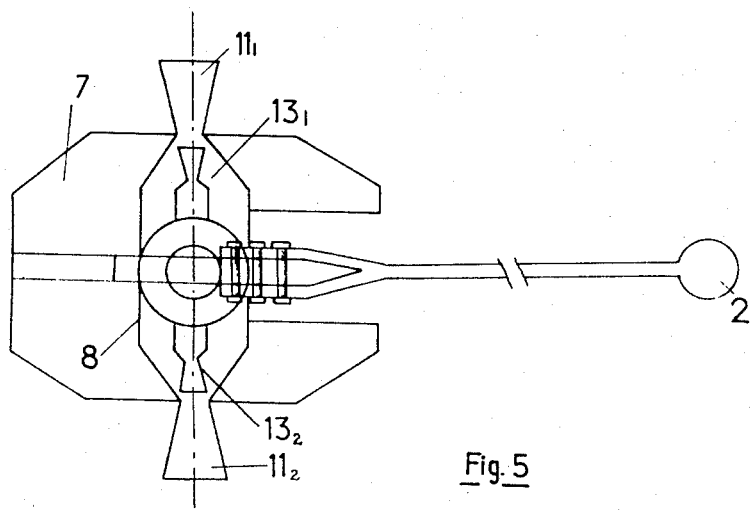

This tilt thrust producing means 11 is, for example, formed by two thrusters $11_1$ and $11_2$ (FIGS. 3 and 5) acting in opposite directions along a line passing through the center of graivty of the moving body and perpendicular to the plane formed by the axes 9 and 10.

According to the invention, one or other of these thrusters $11_1$ and $11_2$ will be put into operation during identical times $t$ (FIG. 1) before and after the respective turning point 5 or 6.

However, because of the tilt thrusts produced by the thrusters $11_1$ and $11_2$, the principal thruster 8 and its axis 10 tend to deviate from the orbital plane. This would thus result in an increasing deviation between the direction of the additional thrust and a direction perpendicular to the new orbit plane 12 if things were left as they are.

According to one embodiment of the present invention, the space vehicle preferably has an ejector 13 with its axis parallel to the tilt thrust produced by the thruster $11_1$ or $11_2$ and offset in relation to the latter along the axis 10 of the principal thruster 8 on the space vehicle. This ejector 13, formed, for example, by two oppositely-directed correcting thrusters $13_1$ and $13_2$, each of which develops a micro-thrust parallel to and offset from the additional thrust produced by the respective tilt thruster $11_1$ or $11_2$ so as to revolve the space vehicle around the radially directed axis 9 of the space vehicle during a given time.

The magnitude of the aforementioned micro-thrust is regulated so that the rotation angle of the space vehicle 7 which it produces is equal to the rotation angle of the orbital plane and in the same direction.

In this way, there is maintained at every moment, the perpendicularity of the direction of the thrust provided by the tilt thruster $11_1$ or $11_2$ in relation to the orbit plane.

This micro-thrust will be automatically delivered by a relay device, at the same time as the tilt thrust or after stopping the latter.

The tilt thrusters $11_1$ and $11_2$ and the correcting thruster $13_1$ and $13_2$ can utilize various sources of energy, such as chemical products accumulated in liquid or solid form, dissolved or compressed gases, nuclear energy, solar energy, etc.

However, the employing of solar energy will be particularly advantageous as it will avoid positioning a power source on the space vehicle.

The device described above can be adapted to any kind of application of solar energy, electric, magneto-hydrodynamic, ionic, etc. . . . methods.

The operation of the device, as described, is as follows:

The additional thrusts produced by the tilt thrusters $11_1$ and $11_2$ occur symmetrically in time before and after the turning points 5 and 6 which have been chosen as the points at which the orbital plane is to be tilted.

The tilt thrusters must then be started and stopped at given times which can be ascertained in the following manner.

For an automatic control solution, the ephemerides of the moving body being known, it suffices to have available on board the moving body a programmed chronometrical appliance for starting and stopping the appropriate tilt thruster before and after the turning point 5 or 6.

This appliance will also control the starting and stopping of the correcting thrusters $13_1$ and $13_2$.

In a remote controlled solution and still as a function of the ephemerides mentioned, it is possible to cause, at a given moment, the starting of the appropriate tilt thruster ahead of the point 5 or 6 selected for the maneuver and to stop it, symmetrically in time, after this point by the same means.

It is also possible to remotely control the starting and stopping of the correcting thruster at these times.

It is also advisable to notice that it will be possible with the above-mentioned appliance, and after having checked by conventional observation means the rotation of the orbit plane, to regulate the operation by remote control on the tilt thruster, either by continuing the unfinished rotation, or for reversing the tilt thruster.

This control will also control the reversing of the correcting thruster.

Figure 6:
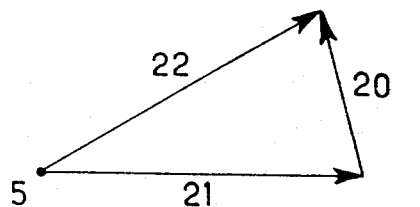

FIGURES 1 to 5 depict an arrangement enabling a given angular rotation to be imparted to the plane of a gravitating space vehicle around a radius vector of the space vehicle's trajectory. This problem is already solved by means putting processes of the "percussion" type into operation, i.e., applying to the space vehicle considerable forces within very short times, so as almost instantaneously to develop an additional speed 20 (FIG. 6), which vectorially added to the gravitation speed before rotation 21, gives as resultant a speed 22 equal in magnitude to this initial speed, but making a certain angle with the latter, hence the rotation of the plane of the orbit.

This prior process possesses many disadvantages. Owing to the short duration of the operation, very strong accelerations occur which, for satellites in gravitation at altitudes of some hundreds or thousands of kilometers, can attain to several hundreds of "g" ($g$=acceleration of earth gravity on the ground, in the case of rotations of some tens of degrees of the orbital plane). Moreover, any inaccuracy on the direction and magnitude of the percussion or almost instantaneous force utilized, risks affecting speed, resulting in serious changes of direction and magnitude, which would undoubtedly destroy gravitational equilibrium. Furthermore, any addition of speed, corresponding to the above-mentioned definition, comprises a component in the orbit plane, implying inopportune variations of the large orbit axis and its eccentricity. In other words, there results a series of parasitic distortions of the orbit which are not without troublesome consequences. Lastly, the angle of initial gravitational speed 21 and the resultant speed 22 only correspond to the rotation angle of the orbit plane if the rotation takes place at the perigee, the apogee or the extremities of the small axis of the orbit. For any other point of this orbit, there is no identity between the angle of the two above-mentioned speeds (21 and 22) and the rotation angle of the orbit plane.

These disadvantages are due to the fact the solution put forward is only valid mechanically for small movements, slight corrections, in which case the risks of errors are reduced. But in the case of rotations of the orbit plane of several degrees or several tens of degrees by this method, the errors become more important, or even nullifying, when the space-ship is inhabited.

The solution provided by the present invention rests on a known principle of rational mechanics: the theorem of the angular momentum. Actually, referring to FIG. 7, in observing that the angular momentum 14 of a keplerian gravitation movement is by definition, constant in magnitude and direction and remains mechanically perpendicular to the orbit plane 1, we can obtain the rotation of said orbit plane around a given radius vector 4 by turning the angular momentum 14 for the required angle—then equal to the rotation angle of the orbit plane for all the cases of figures—in the perpendicular plane to the radius vector passing through the center of gravitation 3 (e.g., the center of the earth in the case of an earth satellite). For this, it is only necessary to impart to the end 15 of the angular momentum 14, a linear speed 16 situated in this plane and that we may choose—for an optimum output—so that it is in normal permanence at the kinetic moment. The theorem of the angular momentum then states that a torque must be created whose moment 17, with reference to the center of gravitation 3, is equipollent with this speed 16. In the case of the present example, this torque is produced by a force $5_2$ perpendicular to the orbital plane at the extreme end 5 of the radius vector 4. The corresponding moment 17, with reference to the center of gravitation 3, is then perpendicular both to the radius vector 4 considered and the force $5_2$. It is thus contained in the orbit plane 1 and perpendicular to the plane of the radius vector 4 and the angular momentum 14.

However, the passage at the rotation point 5 formed by the end of the radius vector 4 being essentially fleeting, it is advisable to develop the force $5_1$ normal to the orbit plane 1 during equal periods of time before and after the passing of the rotation point 5 so that everything happens as if the resultant arising therefrom were effectively applied instantaneously at the rotation point 5, as indicated by the force vector $5_2$ in FIG. 7.

There is no risk of destroying the gravitational equilibrium of the system for the gravitational force exerted on the space vehicle by the astral body 3 is not disturbed. In particular, as no additional force arises in the orbit plane, there can be no parasitic variations of its large orbit axis or of its eccentricity. In the case of satellites already referred to, a change of orientation of a few tens of degrees, in about ten minutes' time, gives rise to accelerations in the region of "g", which are consequently much less strong than percussions of almost instantaneous considerable forces. For slower rotations, connected with only slightly urgent operations, accelerations become negligible, in particular for positioning equatorial satellites drawn from places of non-null latitude.

Lastly, an error in the perpendicularity of the force $5_1$ with reference to the orbit plane 1, only entails differential effects that can be easily corrected by a subsequent determining of the application duration or the value of said force $5_1$.

Figure 10:
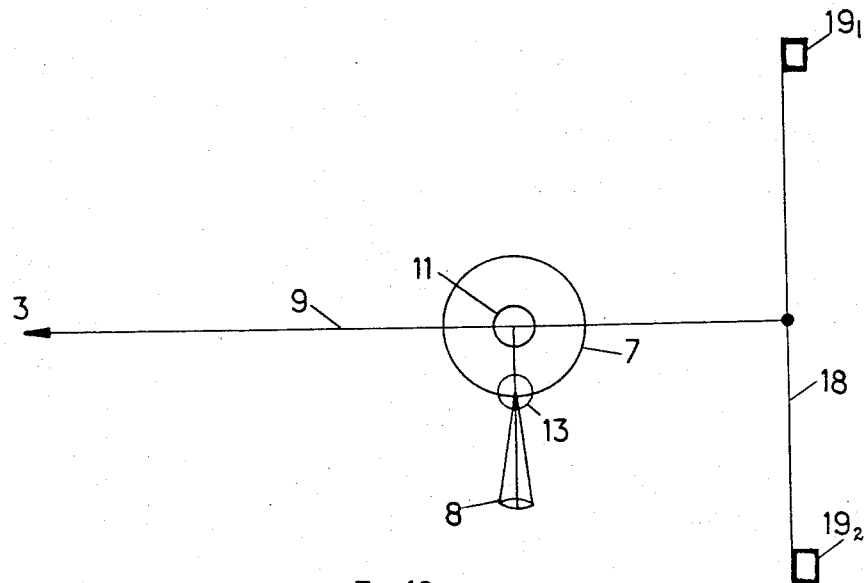
FIGURE 10 is a top view of the space vehicle of FIGURE 9.

However, in order to avoid to the maximum the disadvantages resulting from a perpendicularity defect of the force $5_1$ with reference to the orbit plane, the second embodiment of the present invention, shown in FIGS. 8–10, provides a space vehicle having a rigid mechanical assembly with respect to the axis 9 of the space vehicle body which is always oriented towards the center of gravitation 3. A supporting arm 18 is mechanically connected to the space vehicle at this axis 9. This arm 18 extends perpendicular to the axis 9 and symmetrically on opposite sides of it. Weights $19_1$ and $19_2$, attached to the outer ends of the arm 18 and intended to give rise to the gravity gradient, are symmetrically arranged in relation to the afore-mentioned axis 9. The axis of the principal thruster 8 is, by its construction, in the plane defined by this axis 9 and the cross arm 18. Under these conditions, the axis of the tilt thrust producing means which is perpendicular both to the axis 10 of the principal thruster 8 and the axis 9 directed towards the center of gravitation is permanently perpendicular to the orbit plane defined by the plane of this axis 9 and the cross arm 18.

It is also advisable to point out that by utilizing, in a general manner, considerably smaller thrusts than the prior arrangement for tilting the orbit plane, the arrangement of the present invention is, on the one hand, very much lighter for the same total impulse, which is, a very distinct advantage with regard to weight and performance and on the other hand, occupies much less space.

Figure 11:
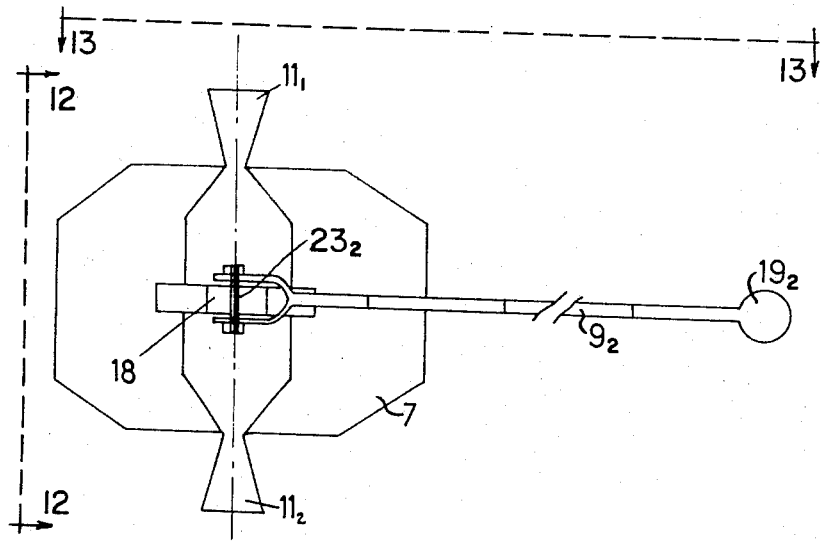
FIGURE 11 shows, schematically a space vehicle in accordance with a third embodiment of the present invention, looking toward its oribital plane and with certain parts omitted for simplicity.
Figure 12:
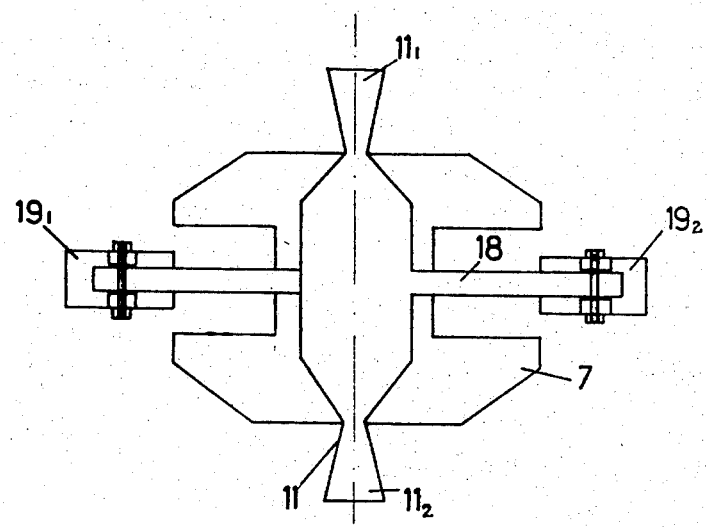
FIGURE 12 is a view of the space vehicle taken along the line 12—12 in FIG. 11.
Figure 13:
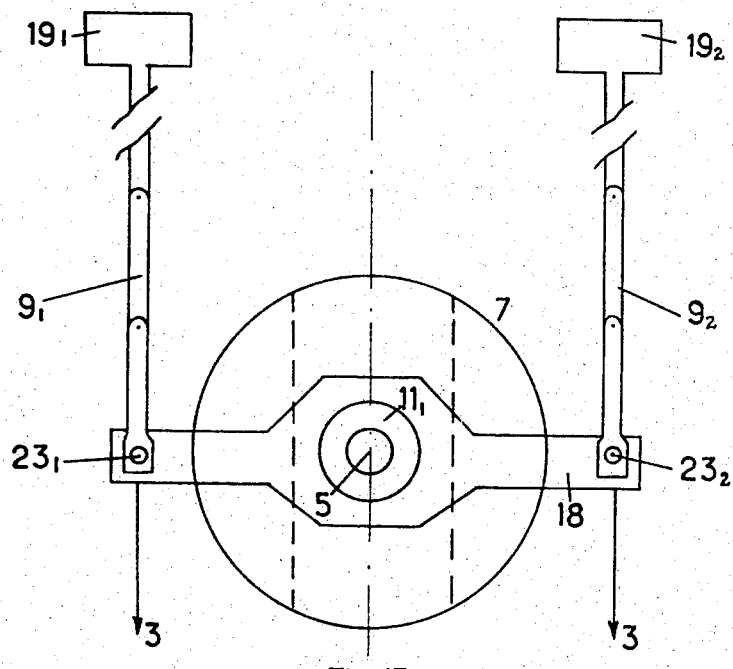
FIGURE 13 is a view of the vehicle taken along the line 13—13 in FIG. 11.

FIGURES 11, 12 and 13 show a space vehicle according to a third embodiment of the present invention in which similar elements have the same reference numerals as in the preceding embodiments. In these figures, the orbit plane is defined by the axis of two elongated arms $9_1$ and $9_2$ carrying weights $19_1$ and $19_2$ and constantly directed radially towards the center of gravitation 3 of the space vehicle. These arms $9_1$ and $9_2$ are articulated on the cross arm 18 by means of axes $23_1$, $23_2$ normal to the orbit plane and cross arm 18. This mounting is, moreover, such that the axis of the tilt thrusters $11_1$, $11_2$ is perpendicular to the cross arm 18 by its construction, and hence, perpendicular to the orbit plane.

What I claim is:

1. On a space vehicle for movement in a gravitational orbit about an astral body, apparatus for selectively determining the orbital plane of the vehicle comprising:

principal thrust producing means on said vehicle for producing a thrust along an axis extending tangent to said orbit and passing substantially through the center of gravity of said vehicle, gravity gradient means on said vehicle oriented radially of said orbit, and tilt thrust producing means on said vehicle for producing a thrust substantially perpendicular to both said tangent axis and the radius of said orbit at said center of gravity of the vehicle symmetrically before and after a predetermined turning point about which the orbital plane of said vehicle is tilted.

2. Apparatus according to claim 1, wherein said gravity gradient means is rigidly positioned on said vehicle with respect to said principal thrust producing means.

3. Apparatus according to claim 1 and further comprising correcting thrust means on said vehicle for maintaining the thrust produced by said principal thrust means tangent to the orbit as the orbit plane of the vehicle is tilted.

4. Apparatus according to claim 3, wherein said correcting thrust means is positioned to produce a correcting thrust on the vehicle substantially parallel to the thrust produced by said tilt thrust means and offset from the center of gravity of the vehicle along the axis of said principal thrust producing means.

5. Apparatus according to claim 4 wherein said gravity gradient means comprises a mass positioned on said vehicle to one side of the axis of said principal thrust producing means.

6. Apparatus according to claim 1, wherein said tilt thrust producing means comprises a first tilt thruster operative to produce a first tilt thrust in one direction perpendicular to both said tangent axis and the radius of said orbit while passing said one turning point for the orbital plane, and a second tilt thruster operative to produce a second tilt thrust in the opposite direction while passing a point of the orbit diametrically opposite said turning point.

7. Apparatus according to claim 6 and further comprising a first correcting thruster which during said first tilt thrust produces a first correcting thrust on a vehicle substantially parallel to and in the same direction as said first tilt thrust and offset from the center of gravity of the vehicle along the axis of said principal thrust producing means to revolve the vehicle about the radius of its orbit through an angle equal to the angle through which the orbital plane of the vehicle is being turned about said one turning point so as to maintain said first tilt thrust continuously perpendicular to the changing orbital plane of the vehicle, and a second correcting thruster which during said second tilt thrust produces a second correcting thrust on the vehicle substantially parallel to and in the same direction as said second tilt thrust and offset from the center of gravity of the vehicle along the axis of said principal thrust producing means to revolve the vehicle about the radius of its orbit through an angle equal to the angle through which the orbital plane of the vehicle is being turned about said second turning point so as to maintain said second tilt thrust continuously perpendicular to the changing orbital plane of the vehicle.

8. Apparatus according to claim 7, wherein said gravity gradient means comprises a mass positioned at one side of the axis of said principal thrust producing means in a direction radially of the vehicle orbit.

9. Apparatus according to claim 7, wherein said gravity gradient means comprises a cross arm attached to the vehicle and extending perpendicular to the vehicle axis which is oriented radially of its orbit and also extending coplanar with the axis of said principal thrust producing means, and a pair of masses connected respectively to said cross arm on opposite sides of the vehicle axis which is oriented radially of its orbit.

10. Apparatus according to claim 9, and further comprising a pair of arms respectively supporting said mass and pivotally connected to said cross arm to extend radially of the vehicle orbit.

References Cited
UNITED STATES PATENTS 3,216,674   11/1965   McLean _____ 244—1

FERGUS S. MIDDLETON, *Primary Examiner.*